(12) United States Patent
Haruki et al.

(10) Patent No.: US 11,038,185 B2
(45) Date of Patent: Jun. 15, 2021

(54) WATER DETECTION DEVICE AND POWER GENERATION CELL

(71) Applicant: HONDA MOTOR CO., LTD., Tokyo (JP)

(72) Inventors: Tatsuro Haruki, Wako (JP); Hidetoshi Utsumi, Tochigi-ken (JP); Eri Terada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 16/445,516

(22) Filed: Jun. 19, 2019

(65) Prior Publication Data
US 2020/0036020 A1 Jan. 30, 2020

(30) Foreign Application Priority Data
Jun. 22, 2018 (JP) .............................. JP2018-118563

(51) Int. Cl.
*H01M 8/04291* (2016.01)
*H01M 8/04492* (2016.01)
*H01M 8/1004* (2016.01)

(52) U.S. Cl.
CPC ... *H01M 8/04291* (2013.01); *H01M 8/04492* (2013.01); *H01M 8/1004* (2013.01)

(58) Field of Classification Search
CPC ......... H01M 8/04291; H01M 8/04492; H01M 8/1004
See application file for complete search history.

(56) References Cited

U.S. PATENT DOCUMENTS

2002/0164518 A1* 11/2002 Wilkinson .......... H01M 8/0228
429/513

FOREIGN PATENT DOCUMENTS

JP 2007-095573 4/2007

* cited by examiner

*Primary Examiner* — Olatunji A Godo
(74) *Attorney, Agent, or Firm* — Amin, Turocy & Watson, LLP

(57) ABSTRACT

A water detection device is provided for a power generation cell. The power generation cell has a reactant gas flow field (oxygen-containing gas flow field) configured to allow a reactant gas to flow along a membrane electrode assembly. The water detection device includes an electrically conductive member and a support member. The support member is an insulating member. The support member covers, and supports an electrically conductive member, and has an opening which exposes part of the electrically conductive member as an electrode. The opening is provided at a position facing a reactant gas flow field.

14 Claims, 10 Drawing Sheets

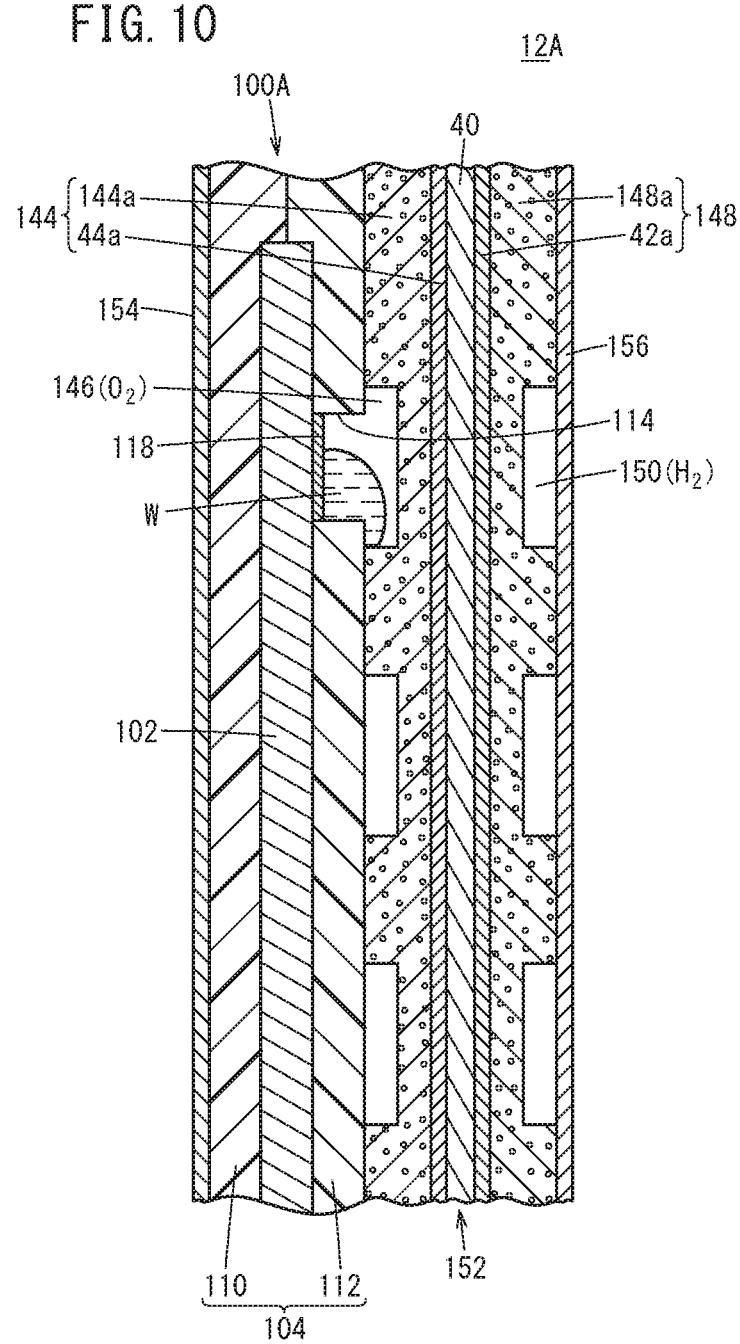

WATER DETECTION DEVICE AND POWER GENERATION CELL

CROSS-REFERENCE TO RELATED APPLICATION

This application is based upon and claims the benefit of priority from Japanese Patent Application No. 2018-118563 filed on Jun. 22, 2018, the contents of which are incorporated herein by reference.

BACKGROUND OF THE INVENTION

Field of the Invention

The present invention relates to a water detection device and a power generation cell.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA) formed by providing an anode on one surface of the solid polymer electrolyte membrane, and a cathode on the other surface of the solid polymer electrolyte membrane. The membrane electrode assembly is sandwiched between separators (bipolar plates) to form a power generation cell unit cell) (e.g., see Japanese Laid-Open Patent Publication No. 2007-095573).

An oxygen-containing gas flow field as one of reactant gas flow fields is formed in the power generation cell to allow an oxygen-containing gas to flow along the membrane electrode assembly. A fuel gas flow field as the other of the reactant gas flow fields is formed in the power generation cell to allow a fuel gas to flow along the membrane electrode assembly. In use, for example, a fuel cell stack formed by stacking a predetermined number of power generation cells is mounted in a fuel cell vehicle.

SUMMARY OF THE INVENTION

In the power generation cell, water (liquid water) is produced as a result of power generation reactions. Further, water vapor in the reactant gases is condensed to produce condensed water (liquid water). Stagnation of the liquid water (water droplets) in the reactant gas flow field causes various problems. For example, such liquid water may deteriorate the gas flow in the reactant gas flow fields, and degrade the power generation stability. Further, at the temperature below the freezing temperature, water may be frozen in the reactant gas flow field, and may cause troubles in start-up operation of the fuel cell stack. If it is possible to detect the presence/absence of liquid water which is retained as stagnant water in the reactant gas flow field, it becomes possible to take some actions for discharging the liquid water as necessary at appropriate timing.

An object of the present invention is to provide a water detection device and a power generation cell which make it possible to detect the presence/absence of liquid water in a reactant gas flow field of a power generation cell.

In order to achieve the above object, according to a first aspect of the present invention, a water detection device provided for a power generation cell having a reactant gas flow field configured to allow a reactant gas to flow along a membrane electrode assembly, the water detection device including an electrically conductive member and an insulating support member configured to cover and support the electrically conductive member, and having an opening configured to expose part of the electrically conductive member as an electrode, wherein the opening is provided at a position facing the reactant gas flow field.

According to a second aspect of the present invention, a power generation cell includes a membrane electrode assembly, and a reactant gas flow field configured to allow a reactant gas to flow along the membrane electrode assembly, the power generation cell including a water detection device configured to detect liquid water in the reactant gas flow field, wherein the water detection device includes an electrically conductive member and an insulating support member configured to cover and support the electrically conductive member, and having an opening configured to expose part of the electrically conductive member as an electrode, and wherein the opening is provided at a position facing the reactant gas flow field.

In the water detection device of the present invention, the electrically conductive member is covered with the insulating support member. The opening which exposes part of the electrically conductive member as the electrode is provided in the support member, at the position facing the reactant gas flow field. In the structure, it is possible to electrically detect the presence/absence of liquid water in the reactant gas flow field.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 10 is a cross sectional view showing a water detection device of a power generation cell according to another embodiment.

DESCRIPTION OF THE PREFERRED EMBODIMENTS

Figure 1:
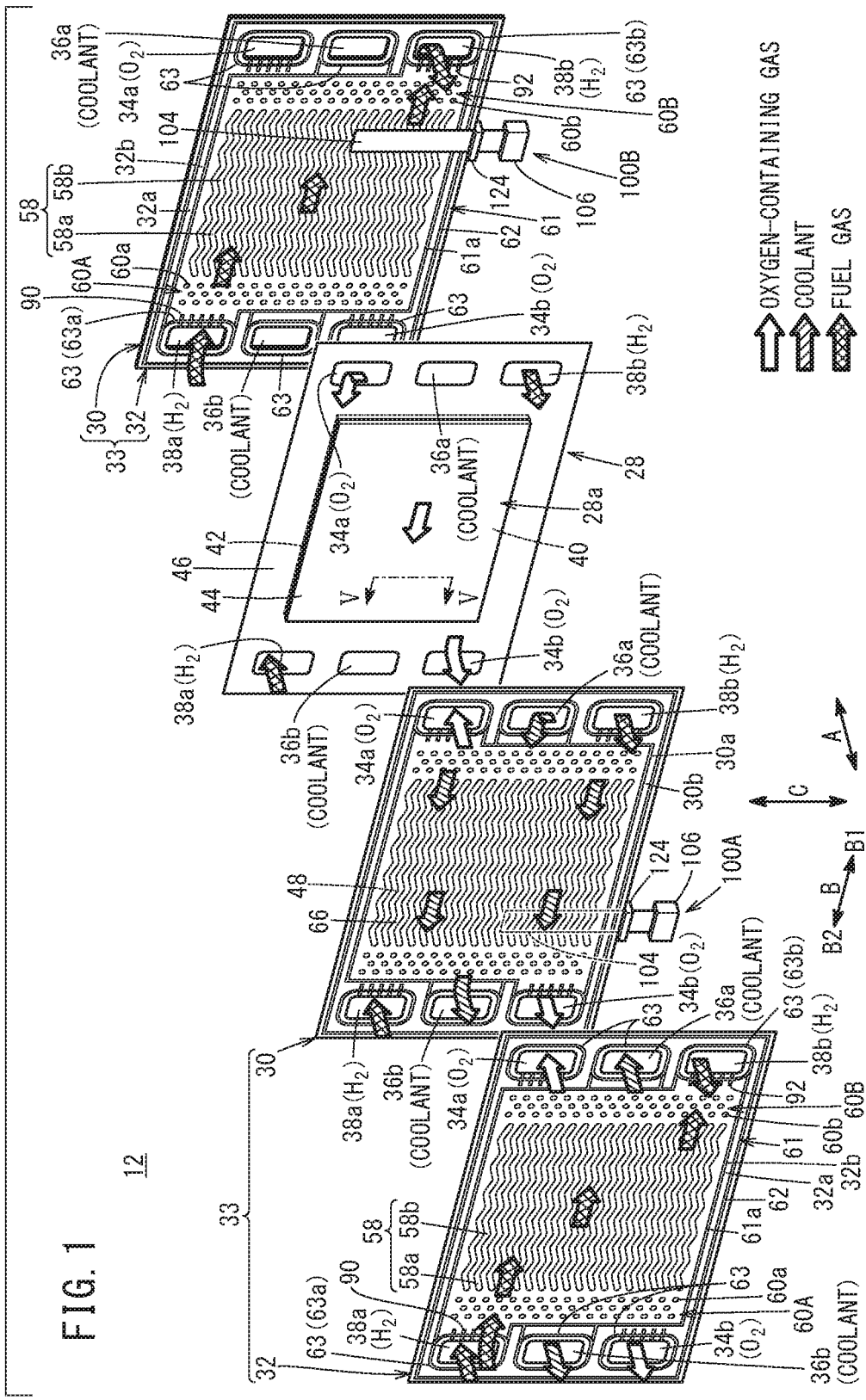
FIG. 1 is an exploded perspective view showing a power generation cell according to an embodiment of the present invention.

A power generation cell 12 according to an embodiment of the present invention shown in FIG. 1 includes a resin film equipped MEA 28, a first metal separator 30 provided on one surface of the resin film equipped MEA 28, and a second metal separator 32 provided on the other surface of the resin film equipped MEA 28. For example, a plurality of power generation cells 12 are stacked together in a horizontal direction indicated by an arrow A or in a gravity direction indicated by an arrow C, and a tightening load (compression load) is applied to the power generation cells 12 to form a fuel cell stack. For example, the fuel cell stack is mounted in a fuel cell electric automobile (not shown) as an in-vehicle fuel cell stack.

For example, each of the first metal separator 30 and the second metal separator 32 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. An outer end of the first metal separator 30 of one of the power generation cells 12 that are adjacent to each other and an outer end of the second metal separator 32 of the other of the power generation cells 12 are joined together by welding, brazing, crimpling, etc. to form a joint separator 33.

At one end of the power generation cells 12 in a longitudinal direction (horizontal direction) (an end in a direction indicated by an arrow B1), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cells 12 in the stacking direction indicated by the arrow A. The oxygen-containing gas supply passage 34a, the coolant supply passage 36a, and the fuel gas discharge passage 38b area arranged in a vertical direction indicated by an arrow C. An oxygen-containing gas is supplied though the oxygen-containing gas supply passage 34a. A coolant such as water is supplied through the coolant supply passage 36a. A hydrogen-containing gas such as a fuel gas is supplied through the fuel gas discharge passage 38b.

At the other end of the power generation cells 12 in the longitudinal direction (horizontal direction) (an end in a direction indicated by an arrow B2), a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cells 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the fuel gas discharge passage 38b is not limited to the above embodiment, and may be changed as necessary depending on the required specification.

The resin film equipped MEA 28 includes a membrane electrode assembly 28a, and a frame shaped resin film 46 provided in an outer peripheral portion of the membrane electrode assembly 28a. The membrane electrode assembly 28a includes an electrolyte membrane 40, and a cathode 44 and an anode 42 provided on both sides of the electrolyte membrane 40.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40.

Figure 5:
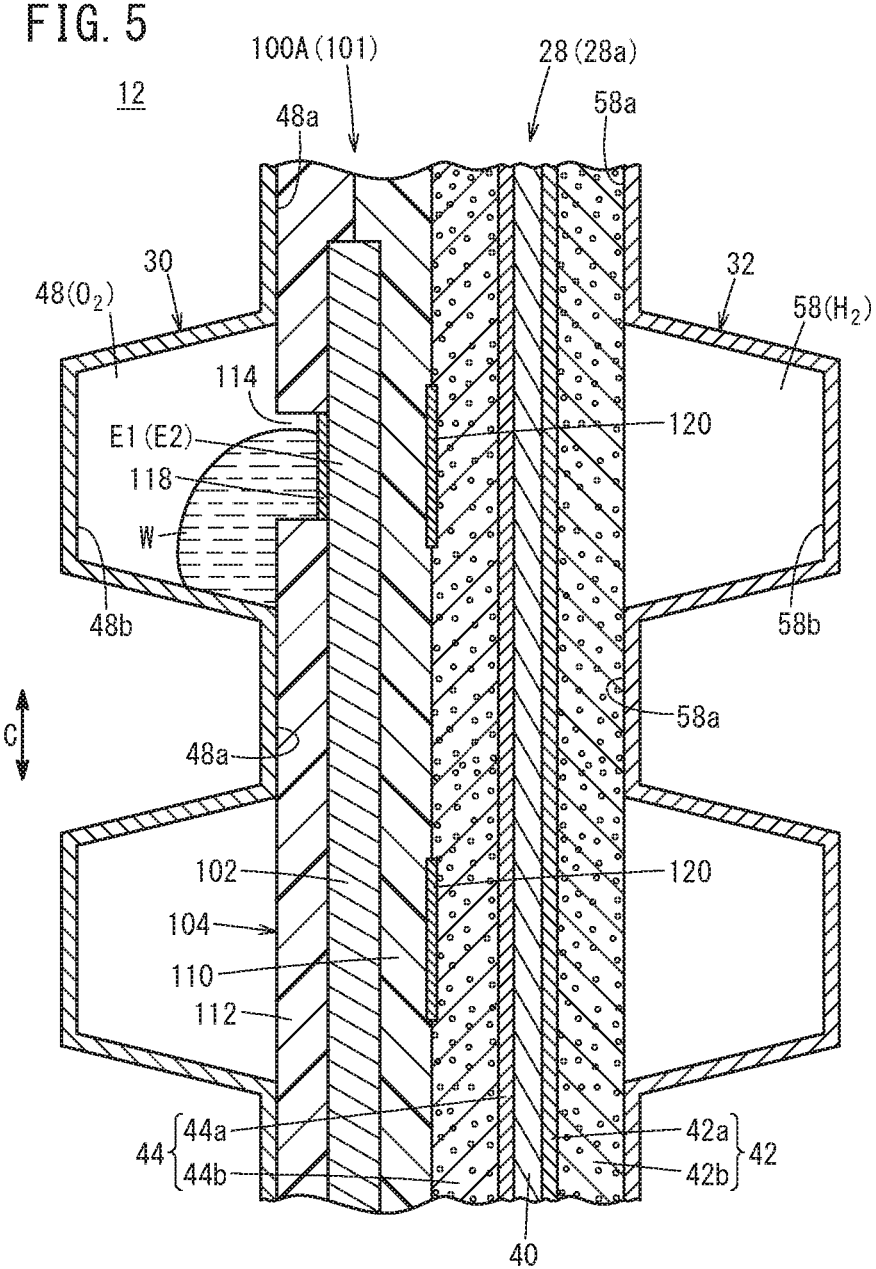
FIG. 5 is a cross sectional view showing a power generation cell including cross section of the water detection device taken along a line V-V in FIG. 1.

As shown in FIG. 5, the cathode 44 includes a first electrode catalyst layer 44a joined to one surface of the electrolyte membrane 40, and a first gas diffusion layer 44b stacked on the first electrode catalyst layer 44a. The anode 42 includes a second electrode catalyst layer 42a joined to the other surface of the electrolyte membrane 40, and a second gas diffusion layer 42b stacked on the second electrode catalyst layer 42a. The first gas diffusion layer 44b and the second gas diffusion layer 42b are electrically conductive layers.

As shown in FIG. 1, at an end of the resin film 46 in the direction indicated by the arrow B1, the oxygen-containing gas supply passage 34a, the coolant supply passage 36a, and the fuel gas discharge passage 38b are provided. At an end of the resin film 46 in the direction indicated by the arrow B2, the fuel gas supply passage 38a, the coolant discharge passage 36b, and the oxygen-containing gas discharge passage 34b are provided.

Figure 2:
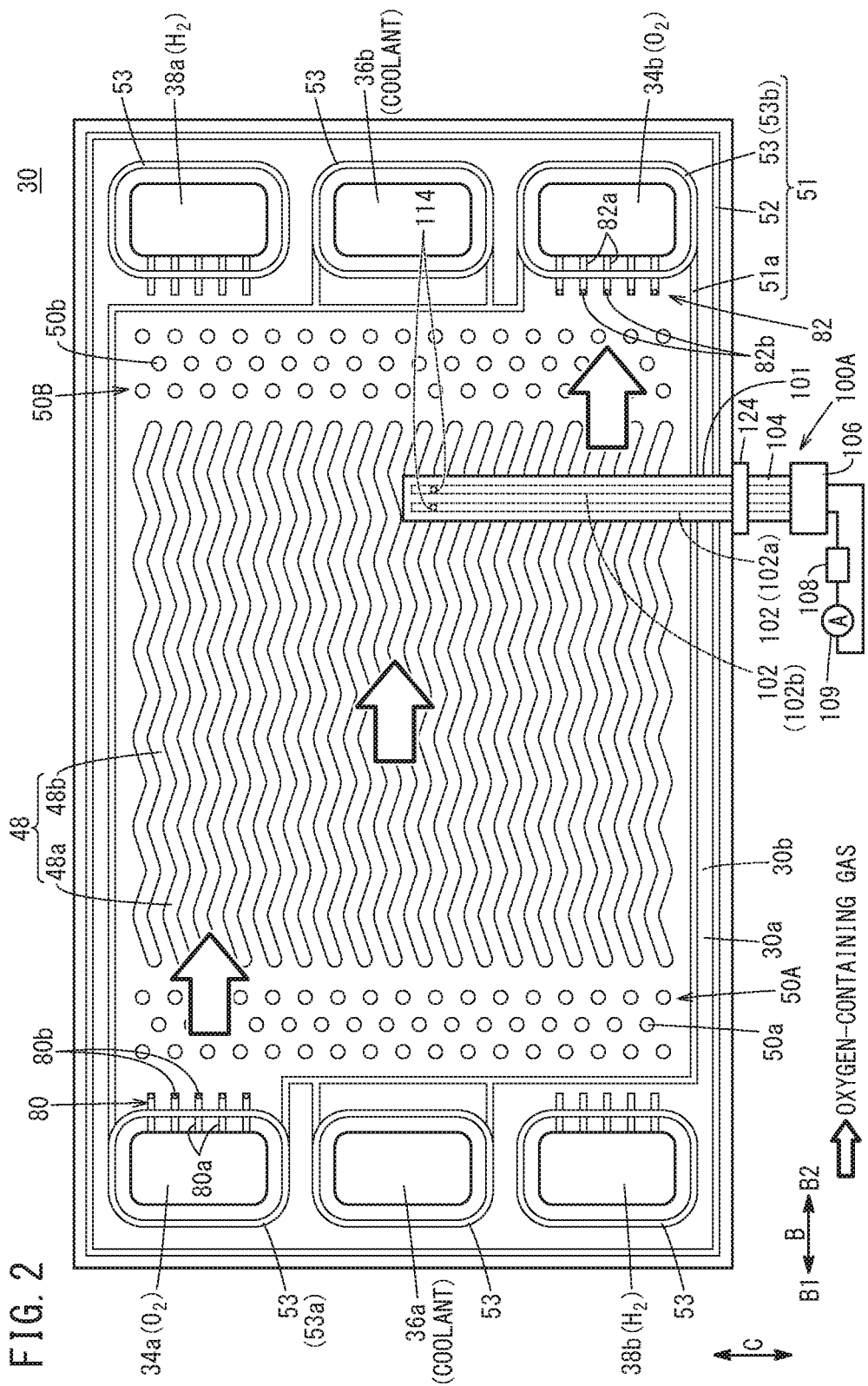
FIG. 2 is a view showing a first metal separator provided with a water detection device, as viewed from a side where an oxygen-containing gas flow field is present.

As shown in FIG. 2, the first metal separator 30 has an oxygen-containing gas flow field 48 on its surface 30a facing the resin film equipped MEA 28 (hereinafter referred to as the "surface 30a"). For example, the oxygen-containing gas flow field 48 extends in a direction indicated by an arrow B. The oxygen-containing gas flow field 48 is in fluid communication with the oxygen-containing gas supply passage 34a and the oxygen-containing gas discharge passage 34b. The oxygen-containing gas flow field 48 includes a plurality of flow grooves 48b formed between a plurality of flow field forming ridges 48a extending in the direction indicated by the arrow B. The flow field forming ridges 48a are formed by press forming, and are expanded toward the resin film equipped MEA 28. In the illustrated embodiment, the flow grooves 48b have a wavy shape extending in the direction indicated by the arrow B. Alternatively, the flow grooves 48b may be straight grooves extending in the direction indicated by the arrow B.

In the surface 30a of the first metal separator 30, an inlet buffer 50A is formed between the oxygen-containing gas supply passage 34a and the oxygen-containing gas flow field 48. The inlet buffer 50A includes a plurality of bosses 50a. In the surface 30a of the first metal separator 30, an outlet buffer 50B is formed between the oxygen-containing gas discharge passage 34b and the oxygen-containing gas flow field 48. The outlet buffer 50B includes a plurality of bosses 50b. The bosses 50a, 50b have a circular shape in a plan view (viewed in the stacking direction). Alternatively, the bosses 50a, 50b may have an oval shape or a linear shape in a plan view (viewed in the stacking direction).

A first seal line 51 is formed on the surface 30a of the first metal separator 30 by press forming. The first seal line 51 is expanded toward the resin film equipped MEA 28 (FIG. 1). Resin material is fixed to protruding front surfaces of the first seal line 51 by printing, coating, etc. For example, polyester fiber is used as the resin material. The resin material may be provided on the part of the resin film 46.

The first seal line 51 includes a bead seal 51a (hereinafter referred to as the "inner bead 51a") provided around the oxygen-containing gas flow field 48, the inlet buffer 50A and the outlet buffer 50B, a bead seal 52 (hereinafter referred to as the "outer bead 52") provided outside the inner bead 51a along the outer end of the first metal separator 30, and a plurality of bead seals 53 (hereinafter referred to as the "passage beads 53") provided around the plurality of fluid passages (oxygen-containing gas supply passage 34a, etc.), respectively. The outer bead 52 protrudes from the surface 30a of the first metal separator 30 toward the resin film equipped MEA 28, and the outer bead 52 is provided along the outer marginal portion of the surface 30a of the first metal separator 30.

The plurality of passage beads 53 protrude from the surface 30a of the first metal separator 30 toward the resin film equipped MEA 28. The passage beads 53 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

Hereinafter, among the plurality of passage beads 53, the passage bead formed around the oxygen-containing gas supply passage 34a will be referred to as the "passage bead 53a", and the passage bead formed around the oxygen-containing gas discharge passage 34b will be referred to as the "passage bead 53b". The above described inlet buffer 50A (a plurality of bosses 50a) is provided between the passage bead 53a and the oxygen-containing gas flow field 48. The above described outlet buffer 50B (a plurality of bosses 50b) is provided between the passage bead 53b and the oxygen-containing gas flow field 48. The first metal separator 30 has bridge sections 80, 82 connecting the inside of the passage beads 53a, 53b (fluid passages 34a, 34b) and the outside (oxygen-containing gas flow field 48) of the passage beads 53a, 53b.

The bridge section 80 is provided in the passage bead 53a around the oxygen-containing gas supply passage 34a. The bridge section 80 includes a plurality of tunnels 80a provided at intervals. The plurality of tunnels 80a are formed by press forming, and are expanded toward the resin film equipped MEA 28 (FIG. 1) in a manner that the tunnels 80a intersect with the passage bead 53a. One end of each of the tunnels 80a is opened to the oxygen-containing gas supply passage 34a. The other end of each of the tunnels 80a has an opening 80b. In the structure, the oxygen-containing gas supply passage 34a and the oxygen-containing gas flow field 48 are connected through the bridge section 80.

The bridge section 82 is provided in the passage bead 53b around the oxygen-containing gas discharge passage 34b. The bridge section 82 includes a plurality of tunnels 82a provided at intervals. The plurality of tunnels 82a are formed by press forming, and are expanded toward the resin film equipped MEA 28 (FIG. 1) in a manner that the tunnels 82a intersect with the passage bead 53b. One end of each of the tunnels 82a is opened to the oxygen-containing gas discharge passage 34b. The other end of each of the tunnels 82a has an opening 82b. In the structure, the oxygen-containing gas discharge passage 34b and the oxygen-containing gas flow field 48 are connected through the bridge section 82.

Figure 6:
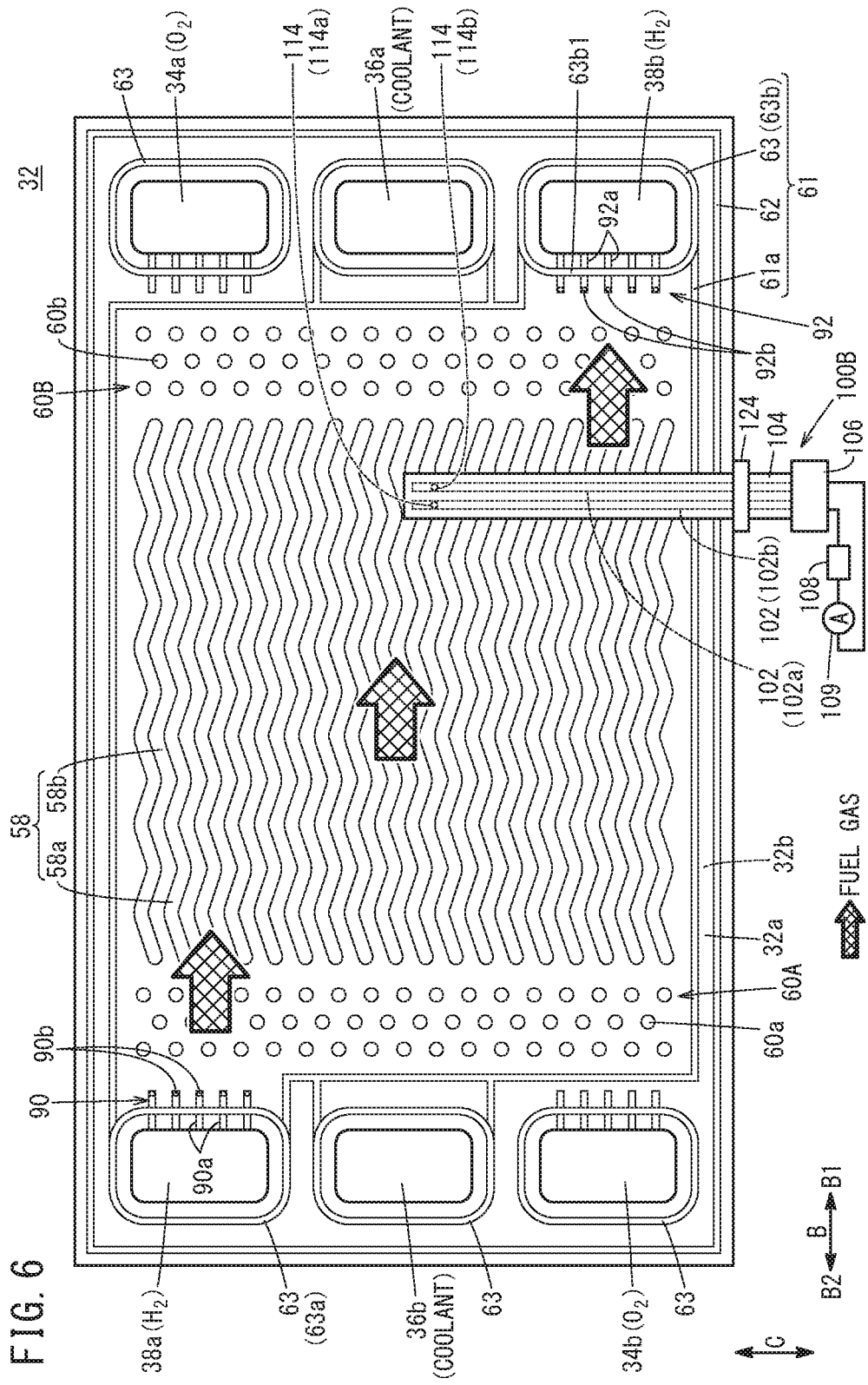
FIG. 6 is a view showing a second metal separator provided with a water detection device, as viewed from a side where a fuel gas flow field is present.

As shown in FIGS. 1 and 6, the second metal separator 32 has a fuel gas flow field 58 on its surface 32a facing the resin film equipped MEA 28 (hereinafter referred to as the "surface 32a"). For example, the fuel gas flow field 58 extends in the direction indicated by the arrow B. As shown in FIG. 6, the fuel gas flow field 58 is in fluid communication with the fuel gas supply passage 38a and the fuel gas discharge passage 38b. The fuel gas flow field 58 includes a plurality of flow grooves 58b formed between a plurality of flow field forming ridges 58a extending in the direction indicated by the arrow B. The flow field forming ridges 58a are formed by press forming, and are expanded toward the resin film equipped MEA 28. In the illustrated embodiment, the flow grooves 58b have a wavy shape extending in the direction indicated by the arrow B. Alternatively, the flow grooves 58b may be straight grooves extending in the direction indicated by the arrow B.

In the surface 32a of the second metal separator 32, an inlet buffer 60A is formed between the fuel gas supply passage 38a and the fuel gas flow field 58. The inlet buffer 60A includes a plurality of bosses 60a. Further, in the surface 32a of the second metal separator 32, an outlet buffer 60B is formed between the fuel gas discharge passage 38b and the fuel gas flow field 58. The outlet buffer 60B includes a plurality of bosses 60b. The bosses 60a, 60b have a circular shape in a plan view (viewed in the stacking direction). Alternatively, the bosses 60a, 60b may have an oval shape or a linear shape in a plan view (viewed in the stacking direction).

A second seal line 61 is formed on the surface 32a of the second metal separator 32 by press forming. The second seal line 61 is expanded toward the resin film equipped MEA 28. Resin material may be fixed to protruding front surfaces of the second seal line 61 by printing, coating, etc. For example, polyester fiber is used as the resin material. The resin material may be provided on the part of the resin film 46.

The second seal line 61 includes a bead seal 61a (hereinafter referred to as the "inner bead 61a") provided around the fuel gas flow field 58, the inlet buffer 60A and the outlet buffer 60B, a bead seal 62 (hereinafter referred to as the "outer bead 62") provided outside the inner bead 61a along the outer end of the second metal separator 32, and a plurality of bead seals 63 (hereinafter referred to as the "passage beads 63") provided around the plurality of fluid passages (fluid passage 38a, etc.), respectively. The outer bead 62 protrudes from the surface 32a of the second metal separator 32, and the outer bead 62 is provided along the outer marginal portion of the surface 32a of the second metal separator 32.

The plurality of passage beads 63 protrude from the surface 32a of the second metal separator 32. The passage beads 63 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

Hereinafter, among the plurality of passage beads 63, the passage bead formed around the fuel gas supply passage 38a will be referred to as the "passage bead 63a", and the passage bead formed around the fuel gas discharge passage 38b will be referred to as the "passage bead 63b". The above described inlet buffer 60A (a plurality of bosses 60a) is provided between the passage bead 63a and the fuel gas flow field 58. The above described outlet buffer 60B (a plurality of bosses 60b) is provided between the passage bead 63b and the fuel gas flow field 58. The second metal separator 32 has bridge sections 90, 92 connecting the inside of the passage beads 63a, 63b (fluid passages 38a, 38b) and the outside (fuel gas flow field 58) of the passage beads 63a, 63b.

The bridge section 90 is provided in the passage bead 63a around the fuel gas supply passage 38a. The bridge section 90 includes a plurality of tunnels 90a provided at intervals. The plurality of tunnels 90a are formed by press forming, and are expanded toward the resin film equipped MEA 28

(FIG. 1) in a manner that the tunnels 90a intersect with the passage bead 63a. One end of each of the tunnels 90a is opened to the fuel gas supply passage 38a. The other end of each of the tunnels 90a has an opening 90b. In the structure, the fuel gas supply passage 38a and the fuel gas flow field 58 are connected through the bridge section 90.

The bridge section 92 is provided in the passage bead 63b around the fuel gas discharge passage 38b. The bridge section 92 includes a plurality of tunnels 92a provided at intervals. The plurality of tunnels 92a are formed by press forming, and are expanded toward the resin film equipped MEA 28 (FIG. 1) in a manner that the tunnels 92a intersect with the passage bead 63b. One end of each of the tunnels 92a is opened to the fuel gas discharge passage 38b. The other end of each of the tunnels 92a has an opening 92b. In the structure, the fuel gas discharge passage 38b and the fuel gas flow field 58 are connected through the bridge section 92.

A coolant flow field 66 is formed between a surface 30b of the first metal separator 30 and a surface 32b of the second metal separator 32 that are adjacent to each other. The coolant flow field 66 is in fluid communication with the coolant supply passage 36a and the coolant discharge passage 36b. The coolant flow field 66 is formed when the back surface of the oxygen-containing gas flow field 48 of the first metal separator 30 and the back surface of the fuel gas flow field 58 of the second metal separator 32 are stacked with each other. The first metal separator 30 and the second metal separator 32 are joined together by welding outer peripheral portions of the first metal separator 30 and the second metal separator 32, and portions around the fluid passages. The first metal separator 30 and the second metal separator 32 may be joined together by brazing instead of welding.

Further, the power generation cell 12 includes a water detection device 100A and a water detection device 100B. In the power generation cell 12 according to the embodiment of the present invention, the water detection device 100A for detecting the presence/absence of liquid water W in the oxygen-containing gas flow field 48, and the water detection device 100B for detecting the presence/absence of liquid water W in the fuel gas flow field 58 are provided. The water detection device 100A is sandwiched between the membrane electrode assembly 28a and the first metal separator 30. The water detection device 100B is sandwiched between the membrane electrode assembly 28a and the second metal separator 32. The water detection device 100A and the water detection device 100B are provided at positions shifted from each other in the flow direction of the reactant gases indicated by the arrow B. Only one of the water detection device 100A and the water detection device 100B may be provided.

The water detection device 100A is in the form of a thin film. Therefore, the first metal separator 30 or the membrane electrode assembly 28a are bent by the thickness of the water detection device 100A, and in the portion where the water detection device 100A is not provided, the membrane electrode assembly 28a and the first metal separator 30 contact each other. Likewise, the second metal separator 32 or the membrane electrode assembly 28a are bent by the thickness of the water detection device 100B, and in the portion where the water detection device 100B is not provided, the membrane electrode assembly 28a and the second metal separator 32 contact each other.

As shown in FIG. 2, the water detection device 100A is provided in a downstream area where water produced in the reaction tends to be retained in the oxygen-containing gas flow field 48 (area of the oxygen-containing gas flow field 48 adjacent to the oxygen-containing gas discharge passage 34b). It should be noted that the water detection device 100A may be provided in an upstream area of the oxygen-containing gas flow field 48 (area of the oxygen-containing gas flow field 48 adjacent to the oxygen-containing gas supply passage 34a), or between the upstream area and the downstream area.

Figure 4:
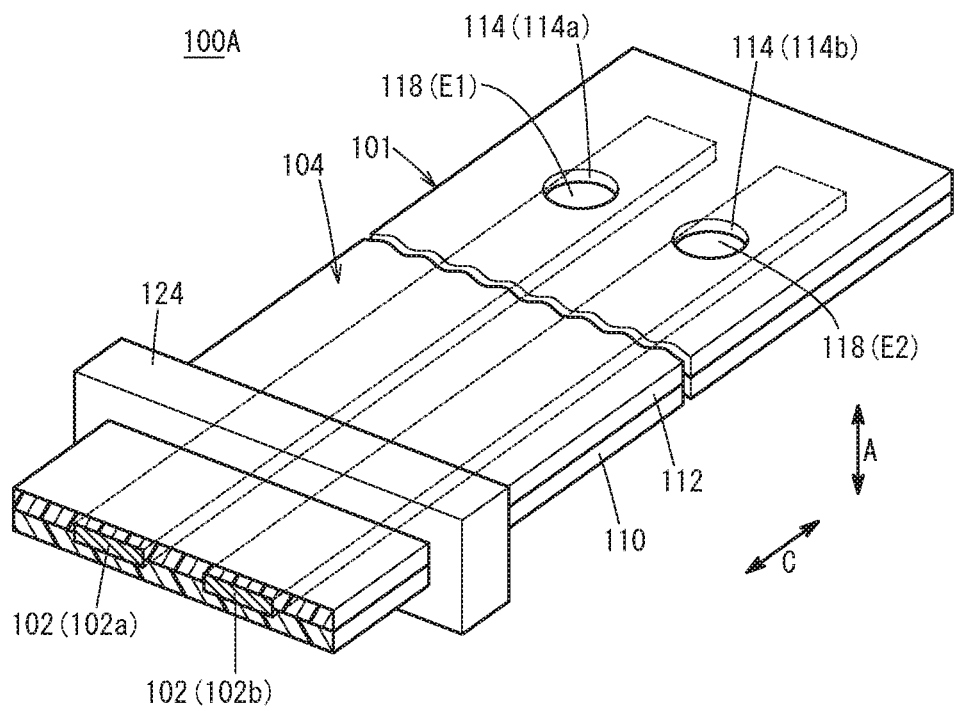
FIG. 4 is a perspective view showing the water detection device.

As shown in FIGS. 2 and 4, the water detection device 100A includes electrically conductive members 102 as wiring members, and a support member 104 as a cover member. The electrically conductive members 102 and the support member 104 form a body section 101 of the water detection device 100A. The body section 101 is in the form of a thin band (film). One end of the body section 101 is provided at a position which is not overlapped with the first metal separator 30, and a connection terminal 106 is provided at the one end of the body section 101. The water detection device 100A is connected to a voltage application device 108 and an ammeter 109 through the connection terminal 106.

The electrically conductive member 102 is in the form of a band (line), and made of metal (e.g., copper, silver, gold, platinum, aluminum, etc.). The electrically conductive member 102 may be made of other electrically conductive material (e.g., carbon). Two electrically conductive members 102 are provided in the water detection device 100A. Hereinafter, one of the electrically conductive members 102 will also be referred to as a "first electrically conductive member 102a", and another of the electrically conductive members 102 will also be referred to as a "second electrically conductive member 102b". The first electrically conductive member 102a and the second electrically conductive member 102b extend in parallel to each other. The electrically conductive members 102 are formed by printing, plating, coating, sputtering, etc. At the time of detecting the presence/absence of the liquid water W by the water detection device 100A, voltage is applied between the first electrically conductive member 102a and the second electrically conductive member 102b by the voltage application device 108.

The support member 104 is made of insulating material. For example, the support member 104 is made of polyimide, PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The support member 104 is in the form of a band extending in a direction (vertical direction indicated by an arrow C) intersecting with a direction in which the oxygen-containing gas flow field 48 extends. In the embodiment of the present invention, the support member 104 extends in a direction perpendicular to the direction in which the oxygen-containing gas flow field 48 extends. In other embodiments, the support member 104 may extend in a direction inclined from the direction in which the oxygen-containing gas flow field 48 extends. The support member 104 is not limited to have a straight shape as viewed in the thickness direction. The support member 104 may have a shape which is bent at any position in its extending direction. The support member 104 covers, and supports the electrically conductive members 102. As shown in FIGS. 4 and 5, the support member 104 includes a pair of electrically insulating sheets (a base sheet 110 and a cover sheet 112). The base sheet 110 and the cover sheet 112 are overlapped with each other in the thickness direction, and are joined together by an adhesive or fused together. The electrically conductive members 102 are sandwiched between the base sheet 110 and the cover sheet 112. The base sheet 110 and the cover sheet 112 may be formed integrally.

Openings 114 are formed in the support member 104 to expose part of the electrically conductive members 102 as electrodes. Specifically, the support member 104 has a first opening 114a which exposes part of the first electrically conductive member 102a as a first electrode E1, and a second opening 114b which exposes part of the second electrically conductive member 102b as a second electrode E2. The openings 114 are formed in the cover sheet 112. The openings 114 extend through the cover sheet 112 in the thickness direction. As shown in FIG. 4, the openings 114 have a circular shape, for example. The openings 114 may have an oval shape or a polygonal shape such as a triangular shape or a rectangular shape.

Figure 3:
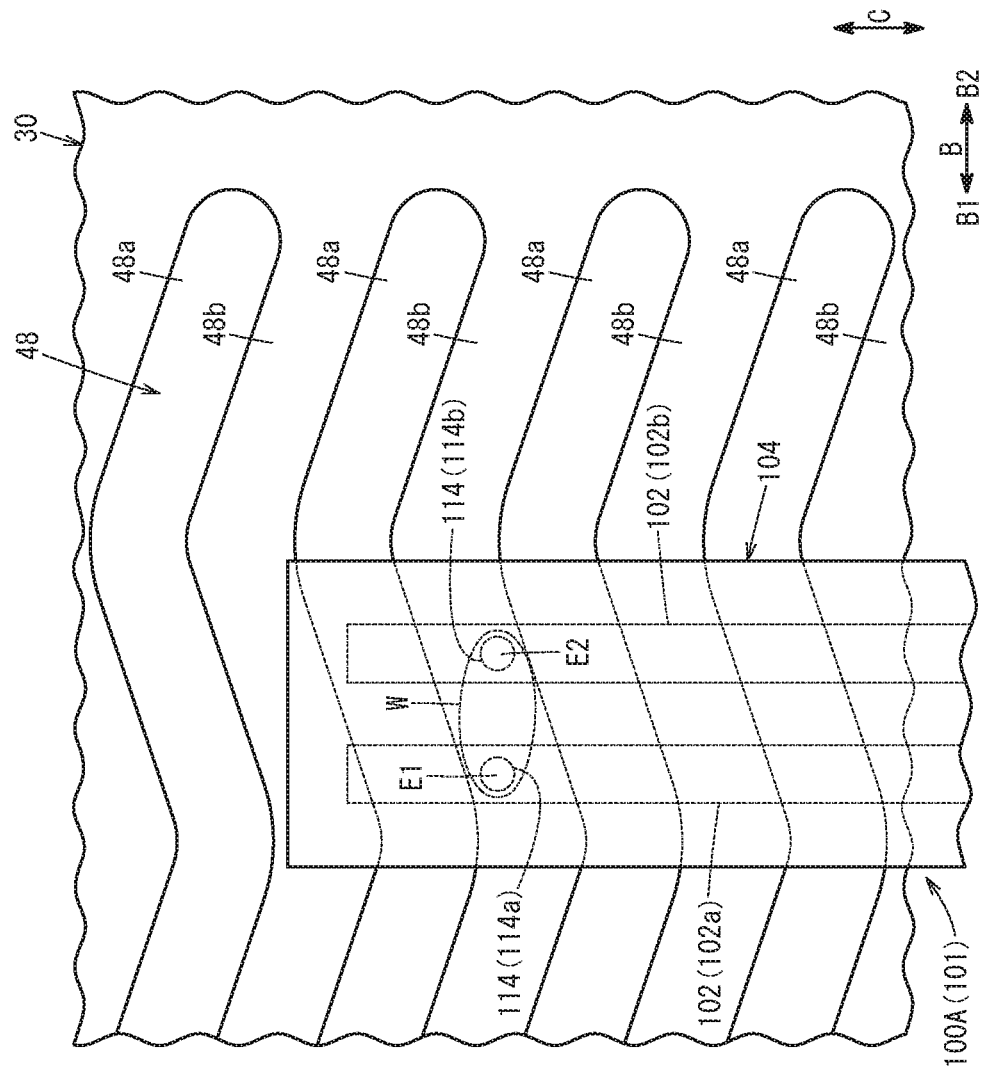
FIG. 3 is an enlarged view showing main components of the water detection device.

As shown in FIGS. 3 and 5, the openings 114 are provided at positions facing the oxygen-containing gas flow field 48 (flow grooves 48b). The positions of the openings 114 may be vertically below the center of the flow grooves 48b in the width direction (indicated by the arrow C).

As shown in FIG. 5, in the opening 114, the surface of the electrically conductive member 102 is covered with an anti-corrosive protection layer 118. The protection layer 118 is made of noble metal (e.g., gold, platinum, etc.), and formed by plating, sputtering, for example. Since the protection layer 118 is an electrically conductive member as in the case of the electrically conductive member 102, the protection layer 118 may be considered as part of the electrically conductive member 102. The portions of the support member 104 on both sides of the opening 114 (both sides of the opening 114 in the direction in which the support member 104 extends) are sandwiched between the flow field forming ridges 48a and the membrane electrode assembly 28a. The body section 101 and the membrane electrode assembly 28a are joined together by an adhesive 120 at a position facing the oxygen-containing gas flow field 48 (flow grooves 48b) through the body section 101. The adhesive 120 may be dispensed with.

As shown in FIGS. 2 and 4, the water detection device 100A further includes a positioning part 124 for positioning the water detection device 100A relative to the first metal separator 30. The positioning part 124 is fixed to the support member 104. The positioning part 124 contacts the outer marginal portion of the first metal separator 30 (and the second metal separator 32). As shown in FIG. 4, the positioning part 124 protrudes from the support member 104 on both sides of the support member 104 in the thickness direction (indicated by the arrow A). The positioning part 124 may be formed integrally with the support member 104. The positioning part 124 may be a member separate from the support member 104, and joined to the support member 104. The shape of the positioning part 124 is not limited to the shape of the embodiment of the present invention.

In FIG. 6, the water detection device 100B provided for the second metal separator 32 has the same structure as the water detection device 100A (FIGS. 2 to 5) provided for the first metal separator 30. That is, the water detection device 100B includes the electrically conductive members 102 (the first electrically conducive member 102a and the second electrically conductive member 102b), the support member 104, the connection terminal 106, and the positioning part 124. In the water detection device 100B, the first opening 114a and the second opening 114b provided in the support member 104 are provided at positions facing the fuel gas flow field 58 (flow grooves 58b).

The water detection device 100B is provided in the downstream area where the water produced in the reaction in the fuel gas flow field 58 tends to be retained (area of the fuel gas flow field 58 adjacent to the fuel gas discharge passage 38b). It should be noted that the water detection device 100B may be provided in the upstream area of the fuel gas flow field 58 (area of the fuel gas flow field 58 adjacent to the fuel gas supply passage 38a) or between the upstream area and the downstream area.

The power generation cell 12 having the above structure is operated in the manner as described below.

Firstly, as shown in FIG. 1, an oxygen-containing gas such as the air is supplied to the oxygen-containing gas supply passage 34a. A fuel gas such as a hydrogen-containing gas is supplied to the fuel gas supply passage 38a. A coolant such as pure water, ethylene glycol, or oil is supplied to the coolant supply passages 36a.

As shown in FIG. 2, the oxygen-containing gas flows from the oxygen-containing gas supply passage 34a into the oxygen-containing gas flow field 48 of the first metal separator 30 through the bridge section 80 and the inlet buffer 50A. Then, as shown in FIG. 1, the oxygen-containing gas flows along the oxygen-containing gas flow field 48 in the direction indicated by the arrow B, and the oxygen-containing gas is supplied to the cathode 44 of the membrane electrode assembly 28a.

In the meanwhile, as shown in FIG. 6, the fuel gas flows from the fuel gas supply passage 38a into the fuel gas flow field 58 of the second metal separator 32 through the bridge section 90 and the inlet buffer 60A. Then, as shown in FIG. 1, the fuel gas flows along the fuel gas flow field 58 in the direction indicated by the arrow B, and the fuel gas is supplied to the anode 42 of the membrane electrode assembly 28a.

Thus, in each of the membrane electrode assemblies 28a, the oxygen-containing gas supplied to the cathode 44 and the fuel gas supplied to the anode 42 are partially consumed in electrochemical reactions in the first electrode catalyst layer 44a and the second electrode catalyst layer 42a to generate electricity.

Then, as shown in FIG. 2, the oxygen-containing gas supplied to the cathode 44 is partially consumed at the cathode 44, and the oxygen-containing gas flows from the oxygen-containing gas flow field 48 into the oxygen-containing gas discharge passage 34b through the bridge section 82. Then, as shown in FIG. 1, the oxygen-containing gas is discharged along the oxygen-containing gas discharge passage 34b in the direction indicated by the arrow A. Likewise, as shown in FIG. 6, the fuel gas supplied to the anode 42 is partially consumed at the anode 42, and the fuel gas flows from the fuel gas flow field 58 into the fuel gas discharge passage 38b through the bridge section 92. Then, as shown in FIG. 1, the fuel gas is discharged along the fuel gas discharge passage 38b in the direction indicated by the arrow A.

Further, the coolant supplied to the coolant supply passage 36a flows into the coolant flow field 66 formed between the first metal separator 30 and the second metal separator 32 in the direction indicated by the arrow B. After the coolant cools the membrane electrode assembly 28a, the coolant is discharged from the coolant discharge passage 36b.

As shown in FIG. 3, in the case where the liquid water W is present in the oxygen-containing gas flow field 48, the first electrode E1 and the second electrode E2 exposed at the first opening 114a and the second opening 114b, respectively, are electrically conducted through the liquid water W. Therefore, when voltage is applied between the first electrically conductive member 102a and the second electrically conductive member 102b, minute electrical current flows between the electrode E1 and the electrode E2. The minute electric current is measured by the ammeter 109. Based on the current value at this time, it is possible to detect the presence/absence of the liquid water W in the oxygen-containing gas flow field 48.

The applied voltage may be either the direct current voltage or the alternating current voltage. The applied voltage may be pulse voltage. For example, the applied voltage is in a range between 0.1 V and 1.0 V. By adopting relative small applied voltage, it is possible to minimize the influence of the voltage applied to the first electrode catalyst layer 44a of the cathode 44, and prevent degradation of the first electrode catalyst layer 44a. It should be noted that the presence/absence of the liquid water W in the fuel gas flow field 58 can be detected also by the water detection device 100B shown in FIG. 6 in the same manner as described above.

The power generation cell 12 according to the embodiment of the present invention offers the following advantages. In the following description, as a representative explanation, advantages of the water detection device 100A provided on the part of the first metal separator 30 will be described. Also in the water detection device 100B provided on the part of the second metal separator 32, the same advantages as in the case of the water detection device 100A are obtained.

In this water detection device 100A, as shown in FIG. 3, etc., the electrically conductive members 102 are covered with the insulating support member 104, and the openings 114 which expose parts of the electrically conductive members 102 as electrodes are provided in the support member 104, at positions facing the reactant gas flow field (oxygen-containing gas flow field 48). In the structure, it is possible to electrically detect the presence/absence of the liquid water W in the reactant gas flow field (oxygen-containing gas flow field 48).

The electrically conductive members 102 include the first electrically conductive member 102a and the second electrically conductive member 102b that are independent from each other. The openings 114 include the first opening 114a which exposes part of the first electrically conductive member 102a as the first electrode E1, and the second opening 114b which exposes part of the second electrically conductive member 102b as the second electrode E2. Then, voltage is applied between the first electrically conductive member 102a and the second electrically conductive member 102b. In the structure, the distance between the electrodes can be kept constant, and it is possible to obtain stable detection accuracy.

As shown in FIG. 5, portions of the support member 104 on both sides of the opening 114 are sandwiched between the flow field forming ridges 48a and the membrane electrode assembly 28a. The flow field forming ridges 48a protrude toward the membrane electrode assembly 28a in the separator (first metal separator 30) and extend along the reactant gas flow field (oxygen-containing gas flow field 48). In the structure, it is possible to hold the opening 114 stably at a predetermined position.

As shown in FIG. 2, the water detection device 100A has the positioning part 124 for positioning the water detection device 100A relative to the separator. In the structure, at the time of assembling the power generation cell 12, it is possible to easily and accurately position the opening 114 of the water detection device 100A at the desired position (facing the reactant gas flow field).

Figure 7:
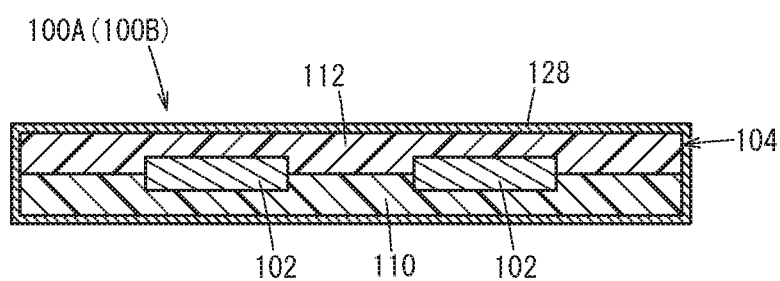
FIG. 7 is a cross sectional view showing the water detection device provided with an electrically conductive membrane covering a support member.

As shown in FIG. 7, the support member 104 may be covered with an electrically conductive membrane 128. The electrically conductive membrane 128 covers the entire periphery of the support member 104 (both surfaces in the thickness direction and both side surfaces in the width direction), in the portion of the support member 104 sandwiched between the membrane electrode assembly 28a and the first metal separator 30 (or the second metal separator 32). The electrically conductive membrane 128 does not cover the openings 114 (see FIG. 4, etc.). As described above, the support member 104 is covered with the electrically conductive membrane 128. In the structure, it is possible to achieve desired electrical conductivity in the portion where the water detection device 100A is provided, between the membrane electrode assembly 28a and the first metal separator 30 (or the second metal separator 32).

Figure 8:
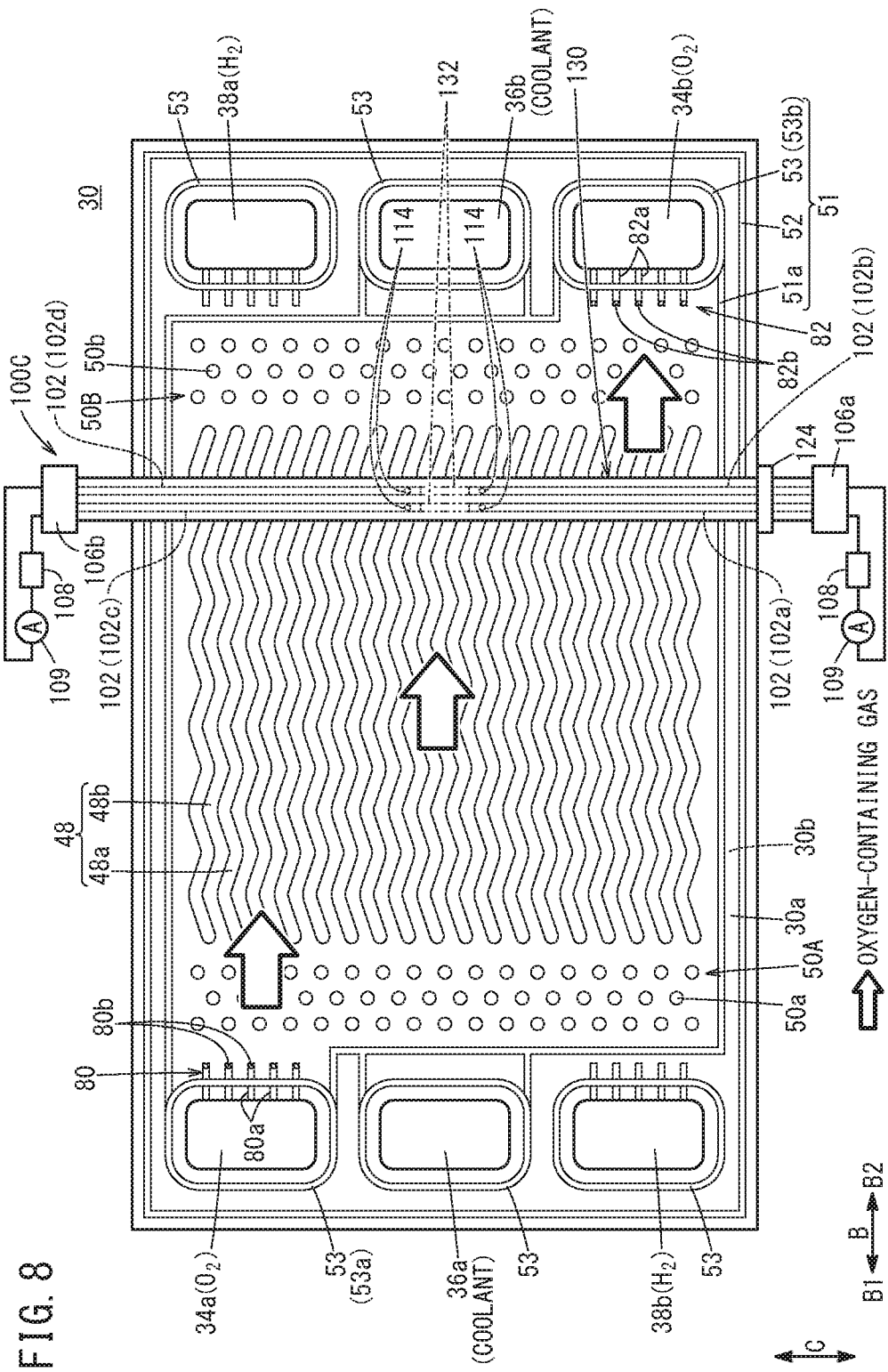
FIG. 8 is a view showing a first metal separator provided with a water detection device according to another embodiment.

A water detection device 100C shown in FIG. 8 is sandwiched between the membrane electrode assembly 28a (FIG. 1) and the first metal separator 30, and connection terminals 106a, 106b are provided at both ends of a band shaped support member 130 in the direction in which the support member 130 extends. Both ends of the support member 130 protrude from the first metal separator 30 downward and upward in the vertical direction. A pair of electrically conductive members 102 (102a, 102b) provided inside the support member 130 are connected to the lower connection terminal 106a. Another pair of electrically conductive members 102 (102c, 102d) provided inside the support member 130 are connected to the upper connection terminals 106b.

Openings 114 are provided in the support member 130 for exposing parts of the pair of electrically conductive members 102a, 102b, respectively. Openings 114 are provided in the support member 130 for exposing parts of the other pair of electrically conductive members 102c, 102d, respectively. This water detection device 100C may be sandwiched between the membrane electrode assembly 28a and the second metal separator 32 (FIG. 1).

In the water detection device 100C, it is possible to detect the presence/absence of the liquid water W at separate two positions in the oxygen-containing gas flow field 48. Therefore, it is possible to improve the detection accuracy of detecting the liquid water W. It should be noted that, as indicated by virtual lines in FIG. 8, the electrically conductive members 102a, 102b on the lower side and the electrically conductive members 102c, 102d on the upper side may be connected together by electrically conductive sections 132. In the structure, even in the case where wire disconnection occurs in any of the electrically conductive members 102, it is possible to detect the presence/absence of the liquid water W using the electrically conductive member 102 which does not have any wire disconnection.

Figure 9:
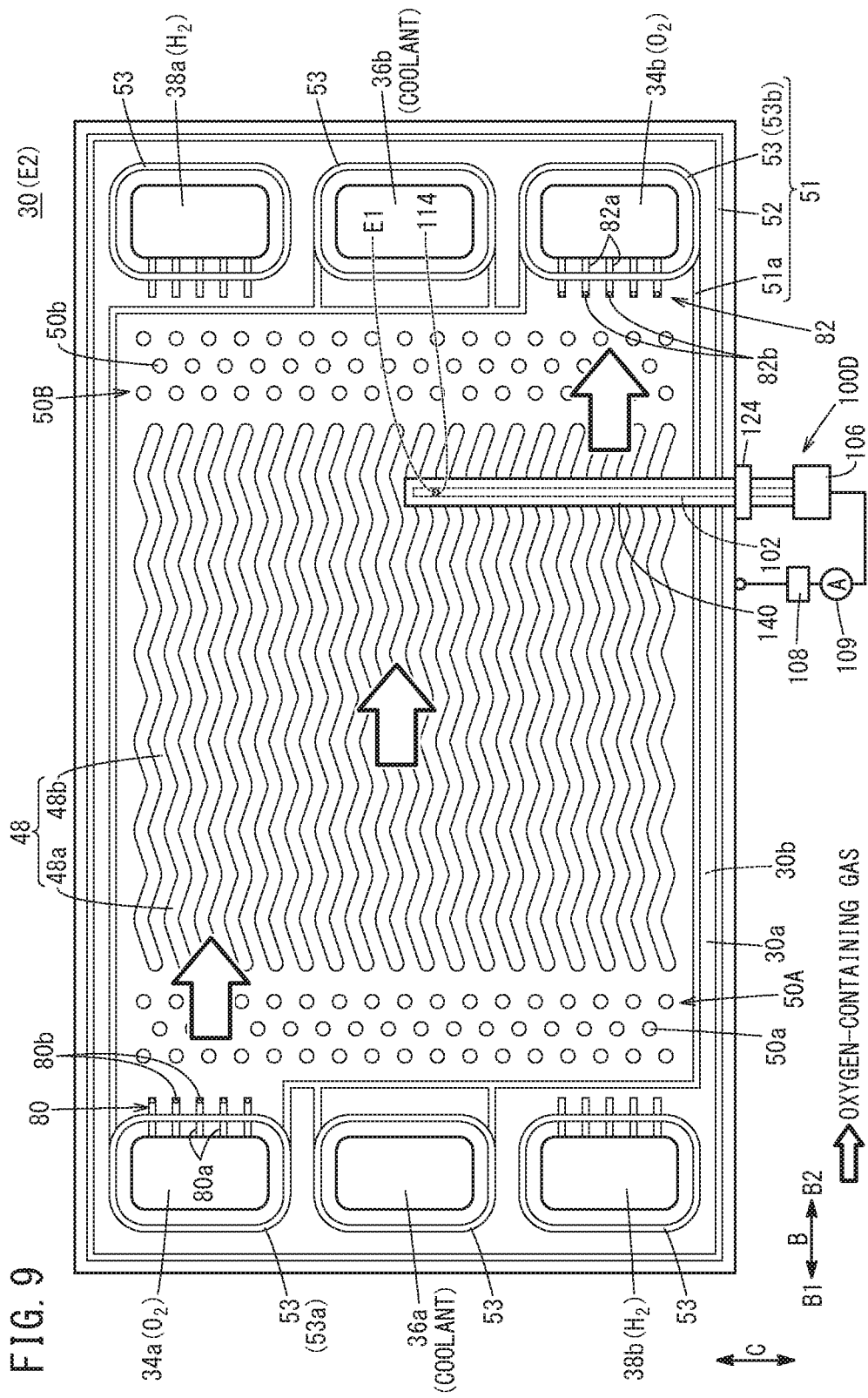
FIG. 9 is a view showing a first metal separator provided with a water detection device according to still another embodiment.

A water detection device 100D as shown in FIG. 9 is sandwiched between the membrane electrode assembly 28a (FIG. 1) and the first metal separator 30, and only one electrically conductive member 102 is provided. An opening 114 is provided in a support member 140 which covers the electrically conductive member 102 but exposes part of the electrically conductive member 102 as the electrode. The electrode of the electrically conductive member 102 serves as a first electrode E1, and the first metal separator 30 serves as a second electrode E2. Voltage is applied between the first electrode E1 and the second electrode E2. Also by this water detection device 100D, in the same manner as in the case of the water detection device 100A shown in FIG. 2, etc. it is possible to detect the presence/absence of the liquid water W in the reactant gas flow field.

It should be noted that the first gas diffusion layer 44b (see FIG. 3) of the membrane electrode assembly 28a which contacts the first metal separator 30 may serve as the second electrode E2. The water detection device 100D may be sandwiched between the membrane electrode assembly 28a and the second metal separator 32. In this case, the second metal separator 32 (or the second gas diffusion layer 42b) is used as the second electrode E2.

As shown in FIG. 10, the water detection device 100A may be applied to a power generation cell 12A having a reactant gas flow field in the form of a recess provided in the gas diffusion layer. Specifically, an oxygen-containing gas flow field 146 in the form of a recess is formed in a first gas diffusion layer 144a of a cathode 144. A fuel gas flow field 150 in the form of a recess is formed in a second gas diffusion layer 148a of an anode 148. A membrane electrode assembly 152 is sandwiched between a pair of flat separators (a first metal separator 154 and a second metal separator 156). The water detection device 100A is sandwiched between the first metal separator 154 and the membrane electrode assembly 152.

An opening 114 in the support member 104 is provided at a position facing the oxygen-containing gas flow field 146. Also in the case where the water detection device 100A is applied to the power generation cell 12A, it is possible to detect the absence/presence of the liquid water W in the reactant gas flow field. It should be noted that the water detection device 100A may be sandwiched between the second metal separator 156 and the membrane electrode assembly 152, and the opening 114 in the support member 104 may be provided at a position facing the fuel gas flow field 150.

The present invention is not limited to the above described embodiment. Various modifications may be made without departing from the gist of the present invention.

What is claimed is:

1. A water detection device provided for a power generation cell having a reactant gas flow field configured to allow a reactant gas to flow along a membrane electrode assembly, the water detection device comprising:
   an electrically conductive member extending in a shape of a wire; and
   an insulating support member configured to cover and support the electrically conductive member, and having an opening configured to expose part of the electrically conductive member as an electrode,
   wherein the electrically conductive member is positioned between a first portion of the insulating support member and a second portion of the insulating support member, wherein the first portion of the insulating support member and the second portion of the insulating support member overlap each other in a thickness direction of the electrically conductive member; and
   wherein the opening is provided at a position facing the reactant gas flow field.

2. The water detection device according to claim 1, wherein the electrically conductive member includes a first electrically conductive member and a second electrically conductive member that are independent from each other;
   the opening includes a first opening configured to expose part of the first electrically conductive member as a first electrode and a second opening configured to expose part of the second electrically conductive member as a second electrode; and
   voltage is applied between the first electrically conductive member and the second electrically conductive member.

3. The water detection device according to claim 1, wherein the electrode of the electrically conductive member serves as a first electrode, a separator in contact with the membrane electrode assembly or a gas diffusion layer of the membrane electrode assembly in contact with the separator serves as a second electrode; and
   voltage is applied between the first electrode and the second electrode.

4. The water detection device according to claim 1, wherein the reactant gas flow field is formed between a separator in contact with the membrane electrode assembly, and the membrane electrode assembly; and
   the water detection device is sandwiched between the membrane electrode assembly and the separator.

5. The water detection device according to claim 4, wherein portions of the insulating support member on both sides of the opening are sandwiched between flow field forming ridges and the membrane electrode assembly, the flow field forming ridges protruding toward the membrane electrode assembly in the separator and extending along the reactant gas flow field.

6. The water detection device according to claim 1, comprising a positioning part configured to position the water detection device relative to a separator which contacts the membrane electrode assembly.

7. The water detection device according to claim 6, wherein the positioning part contacts an outer marginal portion of the separator.

8. The water detection device according to claim 1, wherein the insulating support member is in form of a band extending in a direction intersecting with a direction in which the reactant gas flow field extends.

9. The water detection device according to claim 1, wherein the insulating support member is in form of a band, and connection terminals are provided at both ends of the support member, respectively.

10. The water detection device according to claim 1, wherein the membrane electrode assembly and the insulating support member are joined together by an adhesive or fused together.

11. The water detection device according to claim 1, wherein the insulating support member is covered with an electrically conductive membrane.

12. A power generation cell including a membrane electrode assembly, and a reactant gas flow field configured to allow a reactant gas to flow along the membrane electrode assembly,
   the power generation cell comprising a water detection device configured to detect liquid water in the reactant gas flow field,
   wherein the water detection device includes:
   an electrically conductive member extending in a shape of a wire; and
   an insulating support member configured to cover and support the electrically conductive member, and having an opening configured to expose part of the electrically conductive member as an electrode,
   wherein the electrically conductive member is positioned between a first portion of the insulating support member and a second portion of the insulating support member, wherein the first portion of the insulating support member and the second portion of the insulating support member overlap each other in a thickness direction of the electrically conductive member; and
   wherein the opening is provided at a position facing the reactant gas flow field.

13. The power generation cell according to claim 12, wherein the reactant gas flow field comprises an oxygen-containing gas flow field configured to allow an oxygen-containing gas to flow and a fuel gas flow field configured to allow a fuel gas to flow;
   the power generation cell comprises:
   a first water detection device comprising the electrically conductive member and the insulating support member, and configured to detect liquid water in the oxygen-containing gas flow field; and
   a second water detection device comprising the electrically conductive member and the insulating support member, and configured to detect liquid water in the fuel gas flow field.

14. The power generation cell according to claim 12, wherein the insulating support member extends in a direction perpendicular to a direction in which the reactant gas flow field extends.

* * * * *